United States Patent
Sitson et al.

(10) Patent No.: US 9,975,642 B2
(45) Date of Patent: May 22, 2018

(54) FAN COWL LATCH

(71) Applicant: Rohr, Inc., Chula Vista, CA (US)

(72) Inventors: Kristian Sitson, San Diego, CA (US);
John J. Lee, Thousand Oaks, CA (US);
Yibin Deng, Alhambra, CA (US)

(73) Assignee: ROHR, INC., Chula Vista, CA (US)

( * ) Notice: Subject to any disclaimer, the term of this patent is extended or adjusted under 35 U.S.C. 154(b) by 474 days.

(21) Appl. No.: 14/671,249

(22) Filed: Mar. 27, 2015

(65) Prior Publication Data
US 2016/0280382 A1    Sep. 29, 2016

(51) Int. Cl.

| B64B 1/24 | (2006.01) |
|---|---|
| B64D 27/00 | (2006.01) |
| B64D 29/00 | (2006.01) |
| B64D 31/00 | (2006.01) |
| B64D 33/00 | (2006.01) |
| B64D 35/00 | (2006.01) |
| B64D 29/06 | (2006.01) |
| B64D 29/08 | (2006.01) |

(52) U.S. Cl.
CPC .............. B64D 29/06 (2013.01); B64D 29/08 (2013.01)

(58) Field of Classification Search
CPC .................................. B64D 29/06; B64D 29/08
See application file for complete search history.

(56) References Cited

U.S. PATENT DOCUMENTS

| 2,703,431 A * | 3/1955 | Tatom | E05C 19/145 16/258 |
|---|---|---|---|
| 5,478,125 A * | 12/1995 | Gromotka | E05C 19/14 292/113 |
| 8,113,551 B2 * | 2/2012 | Baic | E05B 15/0006 292/109 |
| 8,659,307 B2 * | 2/2014 | Eriksen | B64D 29/06 324/690 |
| 2005/0024815 A1 * | 2/2005 | Pratt | B64D 29/06 361/600 |
| 2009/0051170 A1 * | 2/2009 | Baic | E05B 15/0006 292/113 |
| 2009/0173823 A1 * | 7/2009 | Shetzer | B64D 29/06 244/129.4 |
| 2012/0235425 A1 * | 9/2012 | Do | E05C 1/065 292/150 |

* cited by examiner

*Primary Examiner* — Philip J Bonzell
(74) *Attorney, Agent, or Firm* — Snell & Wilmer, L.L.P.

(57) ABSTRACT

A nacelle may include fan cowl panels which may be opened to provide access to the fan case. A latching mechanism may latch a left fan cowl panel to a right fan cowl panel. As a handle is opened to unlatch the latching mechanism, the movement of the handle may cause a push pin to create a separation between the left fan cowl panel and the right fan cowl panel. The separation may create a visual indication that the fan cowl panels are not latched together, which may prevent an aircraft from inadvertently taking off with unlatched fan cowl panels. The push pin when extended may prevent closure of the fan cowl panels.

9 Claims, 4 Drawing Sheets

FAN COWL LATCH

FIELD

The disclosure generally relates to turbofan propulsion systems for aircraft. More particularly, the disclosure relates to latches for a fan cowl in a nacelle for a turbofan propulsion system.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a fan cowl which forms the outer portion of the nacelle in the area of the fan case. The fan cowl typically has two halves which may hinge open to provide access to the fan cowl and any components mounted on it, which sometimes includes a lube oil sump and pump, the computer for controlling the engine, etc.

Latches have been used to latch the fan cowl halves to each other, but these existing latches suffer from various disadvantages or insufficiencies. For example, in the event that the latch is not manually engaged prior to engine operation, the fan cowl halves are not secured. The location of the latches may be obscured from quick visual inspection. Thus, it is possible for unlatched fan cowl halves to go unnoticed should the latches not be properly inspected, and an aircraft may takeoff with unlatched fan cowl halves. The fan cowl halves may separate from the nacelle during flight if the latches are not secured.

SUMMARY

An aircraft nacelle may comprise a first fan cowl panel rotatable about a first hinge and a second fan cowl panel rotatable about a second hinge. The first fan cowl panel and the second fan cowl panel may be rotatable between a closed position in which the first fan cowl panel and the second fan cowl panel form an exterior of the aircraft nacelle, and an open position in which the first fan cowl panel and the second fan cowl panel are separated. The aircraft nacelle may comprise a latching mechanism configured to prevent the first fan cowl panel from separating from the second fan cowl panel, wherein the latching mechanism comprises a push pin which is driven by movement of a latching mechanism handle to extend when the latching mechanism opens.

In various embodiments, the push pin may comprise a first rod, a second rod, and an axial rod connecting the first rod to the second rod. The axial rod may extend through the slot in the handle. The push pin may be configured to separate the first fan cowl panel and the second fan cowl panel in response to the handle being rotated. The slot may comprise a proximal end and a distal end, wherein the push pin is configured to slide from the distal end to the proximal end in response to the handle being opened. The latching mechanism may be a number one latch. The latching mechanism may be configured to maintain a separation between the first fan cowl panel and the second fan cowl panel in response to the latching mechanism being in an unlatched position. The separation may be visible between the first fan cowl panel and an inlet of the aircraft nacelle.

An aircraft nacelle may comprise a first fan cowl panel configured to move relative to the nacelle to provide access to a fan case. A latch may be coupled to the first fan cowl panel and movable between a latched position in which the latch prevents relative movement between the first fan cowl panel and a second fan cowl panel, and an unlatched position in which the latch permits relative movement between the first fan cowl panel and the second fan cowl panel. The latch may be configured to interfere with the first fan cowl panel moving to the closed position when the latch is in the unlatched position.

In various embodiments, the latch may comprise a handle and a push pin located at least partially within a slot in the handle. The push pin may be configured to slide within the slot. The push pin may be configured to slide from a distal end of the slot to a proximal end of the slot in response to the handle opening. The push pin may comprise a first rod, a second rod, and an axial rod connecting the first rod to the second rod. The axial rod may be located within the slot. In the unlatched position, a separation may be visible between the first fan cowl panel and an inlet of the aircraft nacelle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for latching fan cowl panels are disclosed. Latches may be employed to close and secure fan cowl panels together for flight. A latch is preferable to a permanent mechanical attachment of the fan cowl panels because the fan cowl panels should be removable or openable by ground support personnel in order to reach the fan case for inspection and servicing. However, in certain circumstances, maintenance personnel may forget to latch the latches prior to flight, and an unlatched latch may be overlooked during pre-flight check.

In accordance with the present invention, a latch may be used which creates visible separation between the fan cowl panels and between the fan cowl panels and the balance of the nacelle structure such as the thrust reverser and the inlet when unlatched. The latch may include a push pin. In response to the latch being opened, the push-pin may force apart the fan cowl panels at the location of the latch at the bottom of the nacelle. The push pin may create a gap at the bottom of the nacelle between the fan cowl panels. The push pin may maintain the fan cowl panels in a partially hinged open state. A separation may be visible between the fan cowl panels and the inlet, which may signal to maintenance personnel that the fan cowl is unlatched, and the aircraft is not ready for flight.

Figure 1:
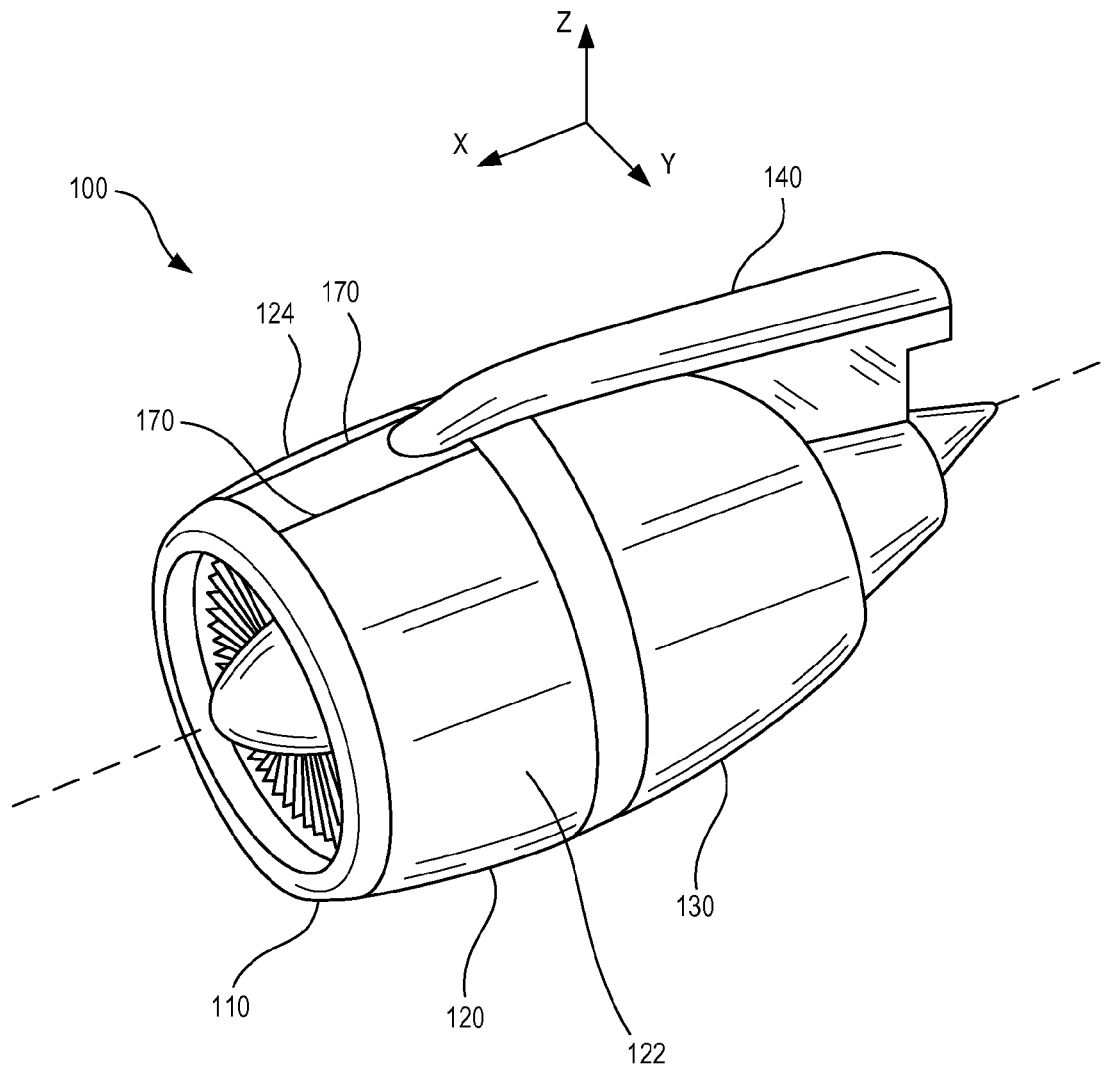
FIG. 1 illustrates a perspective view of a nacelle in accordance with various embodiments of the disclosure.

Referring to FIG. 1, a nacelle 100 for a gas turbine engine is illustrated according to various embodiments. X-y-z axes are shown for ease of illustration. As used herein, the term forward represents the positive x-direction, the term rear or aft represents the negative x-direction, the term left represents the positive y-direction, the term right represents the negative y-direction, the term down represents the negative z-direction, and the term up represents the positive z-direction. Nacelle 100 may comprise an inlet 110, a fan cowl 120, and a thrust reverser 130. Nacelle 100 may be coupled to a pylon 140, which may mount the nacelle 100 to an aircraft wing or aircraft body.

The fan cowl 120 may comprise a left fan cowl panel 122 and a right fan cowl panel 124. The left fan cowl panel 122 and the right fan cowl panel 124 may hinge open at hinges 170. The left fan cowl panel 122 and the right fan cowl panel 124 may hinge open at hinges 170 in order to provide access to the fan case for inspection or servicing. The left fan cowl panel 122 and the right fan cowl panel 124 may together help form the exterior of the nacelle 100 when the left fan cowl panel 122 and the right fan cowl panel 124 are closed. The left fan cowl panel 122 and the right fan cowl panel 124 may be latched together at the bottom of the nacelle 100 where the left fan cowl panel 122 and the right fan cowl panel 124 meet.

Figure 2:
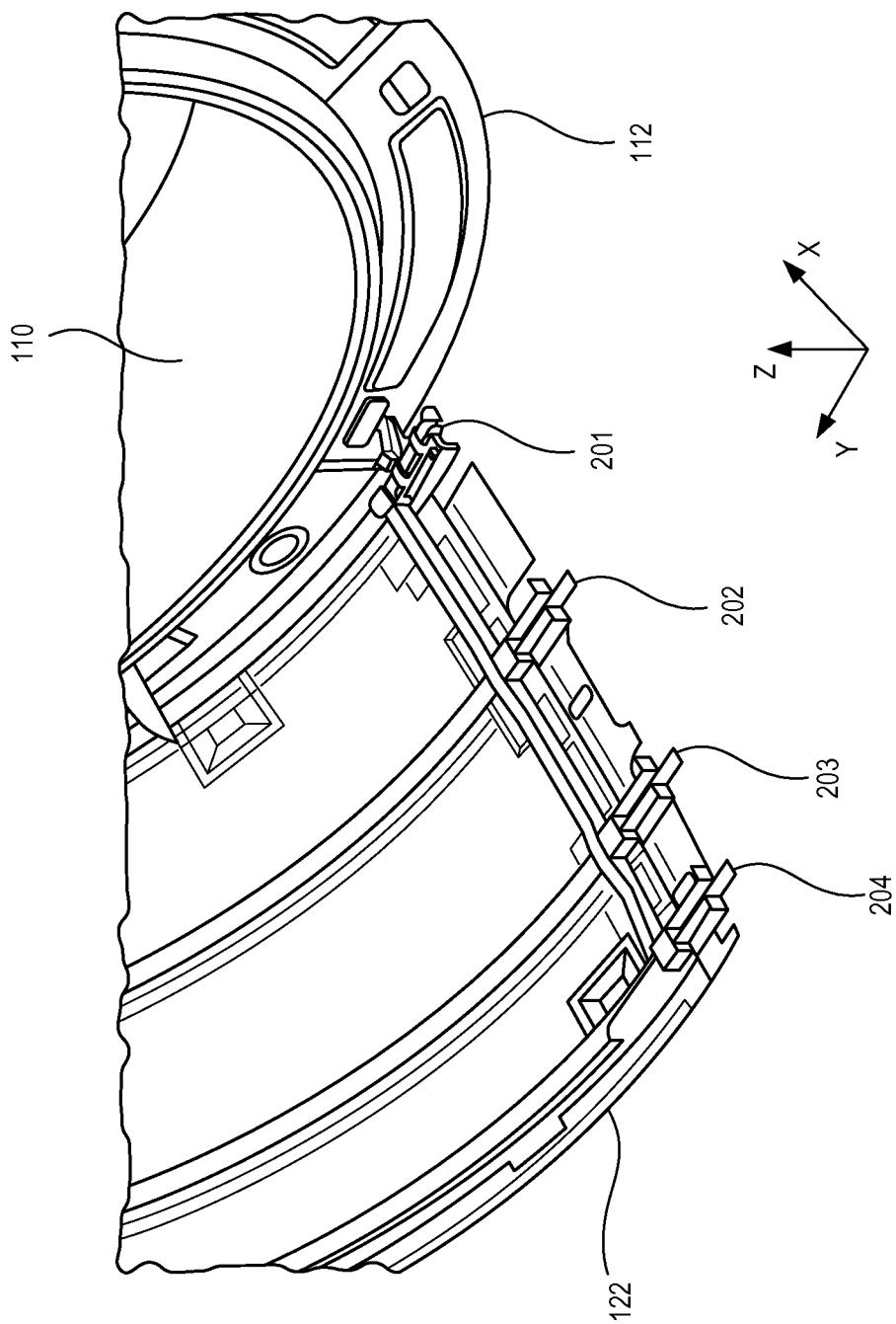
FIG. 2 illustrates an interior view of a left fan cowl panel in accordance with various embodiments of the disclosure.

Referring to FIG. 2, a perspective view of the interior of a left fan cowl panel 122 is illustrated according to various embodiments. The left fan cowl panel 122 is located aft of the inlet 110 and adjacent to an inlet aft bulkhead 112. The right fan cowl panel 124 is not shown in FIG. 2 for ease of illustration. The left fan cowl panel 122 may be coupled to the right fan cowl panel 124 by a series of latches. A number one latch 201 may be the most forward latch. A number two latch 202, a number three latch 203, and a number four latch 204 may be located aft of the number one latch 201. Maintenance personnel may be trained to close the latches sequentially, starting with the number one latch 201, followed by the number two latch 202, the number three latch 203, and the number four latch 204. The latches may be opened in the opposite order, starting with the number four latch 204, followed by the number three latch 203, the number two latch 202, and the number one latch 201.

The number one latch 201 may be configured to create a separation between the left fan cowl panel 122 and the right fan cowl panel 124 in response to being unlatched. Thus, the number two latch 202, the number three latch 203, and the number four latch 204 may not be latched while the number one latch 201 is unlatched and the left and right panels 122, 124 are separated. Similarly, the number one latch 201 may not be unlatched while the number two latch 202, the number three latch 203, or the number four latch 204 are latched, as will be better explained below. The separation created by the unlatched number one latch 201 may be easily visible to maintenance personnel, both in the area of the latches at the bottom of the fan cowl panels 122, 124, as well as circumferentially about the nacelle at the interface between the fan cowl and the inlet and at the interface between the fan cowl and the thrust reverser. Thus, it would be even more apparent to maintenance personnel that a fan cowl panel is not latched, and the fan cowl panels should be latched before flight.

Figure 3:
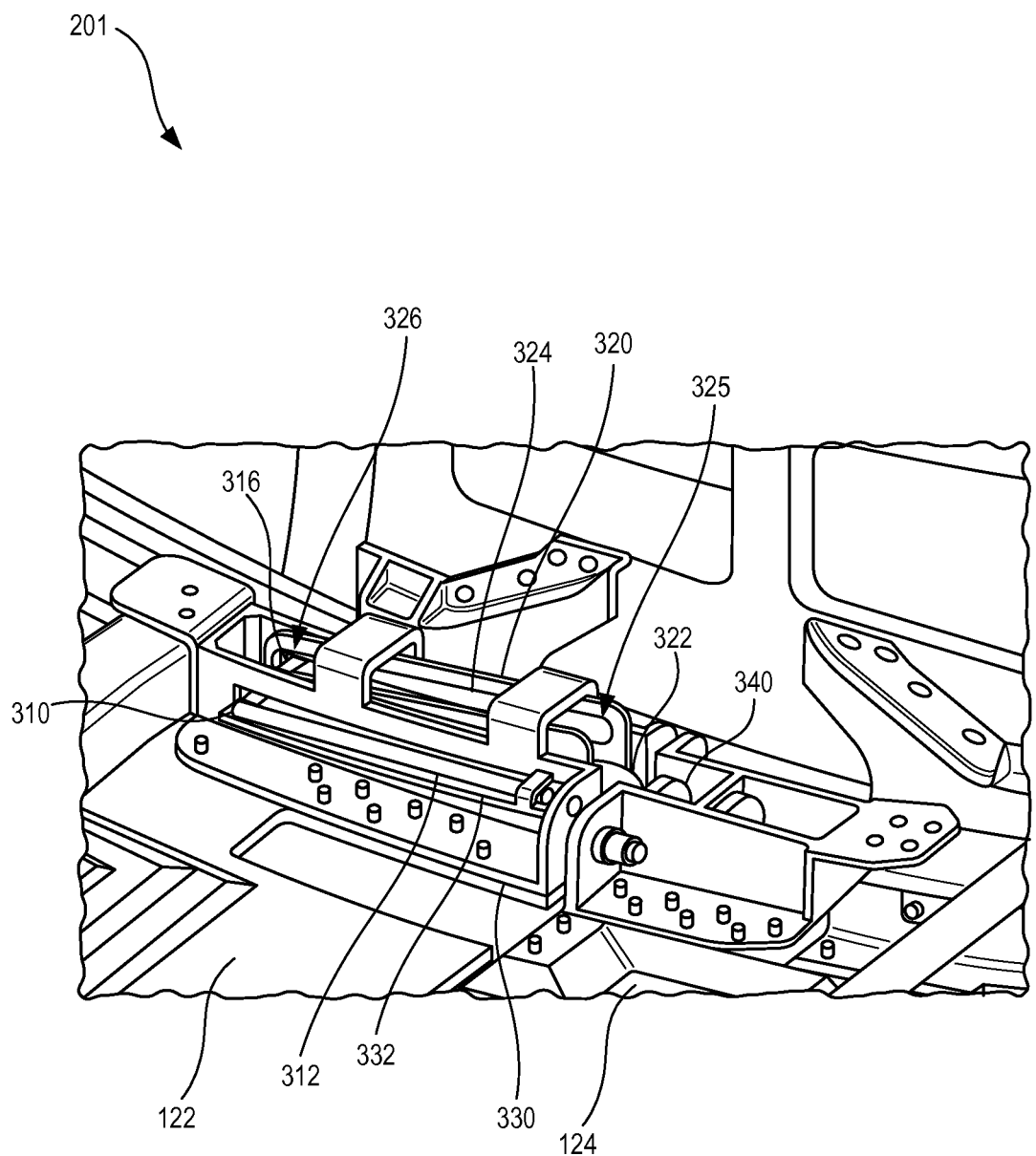
FIG. 3 illustrates a perspective view of a latch with a push pin in accordance with various embodiments of the disclosure.

Referring to FIG. 3, a perspective view of a number one latch 201 comprising a push pin 310 is illustrated in the latched position according to various embodiments. The number one latch 201 may comprise a handle 320 located within a latch housing 330 coupled to the left fan cowl panel 122. The handle 320 may comprise a hook 322. The hook 322 may engage a keeper 340 coupled to the right fan cowl panel 124. Contact and tension between the hook 322 and the keeper 340 prevents the left fan cowl panel 122 and the right fan cowl panel 124 from separating.

The number one latch 201 may comprise a push pin 310. The push pin 310 may comprise a first push rod 312 and a second push rod 314 (shown in FIG. 4), although use of only one push rod or more than two may also be possible. The first push rod 312 and the second push rod 314 may be connected by an axial rod 316. The axial rod 316 may extend through a slot 324 in the handle. The axial rod 316 may also extend through a guide 332 in the latch housing 330, which may prevent the push pin 310 from rotating with the handle 320. The slot 324 may comprise a proximal end 325 and a distal end 326. In the latched position, the axial rod 316 may extend through the distal end 326 of the slot 324. In response to the handle 320 being pivoted in a counter-clockwise direction (looking from aft to forward), the slot 324 in the handle 320 may contact the axial rod 316 and may force the push pin 310 toward the right fan cowl panel 124. The push pin 310 may contact the right fan cowl panel 124 and separate the right fan cowl panel 124 from the left fan cowl panel 122. The axial rod 316 may slide through the slot 324 until the handle 320 is fully rotated, at which point the axial rod 316 may extend through the proximal end 325 of the slot. With this specific configuration, the push pin 310 is always retracted when the latch 201 is closed and always extended when the latch 201 is open, with the pivoting movement of the latch handle 320 directly or indirectly driving the extension and retraction motion of the push pin 310. This configuration is not required in all implementations. It may be desirable, and those of ordinarily skill in this art would be able to provide a lost motion device, such as a spring, between the latch handle 320 and the push pin 310 in certain implementations. When they are linked without lost motion, then it requires the latch 201 to be opened only after the other latches are first unlatched, and the latch 201 to close before the other latches are closed, which is the preferred order for the latching system. Also, with this configuration there is no possibility that the cowl panels 122, 124 could be pushed together to obscure the gap between them when the latch 201 is opened.

Figure 4:
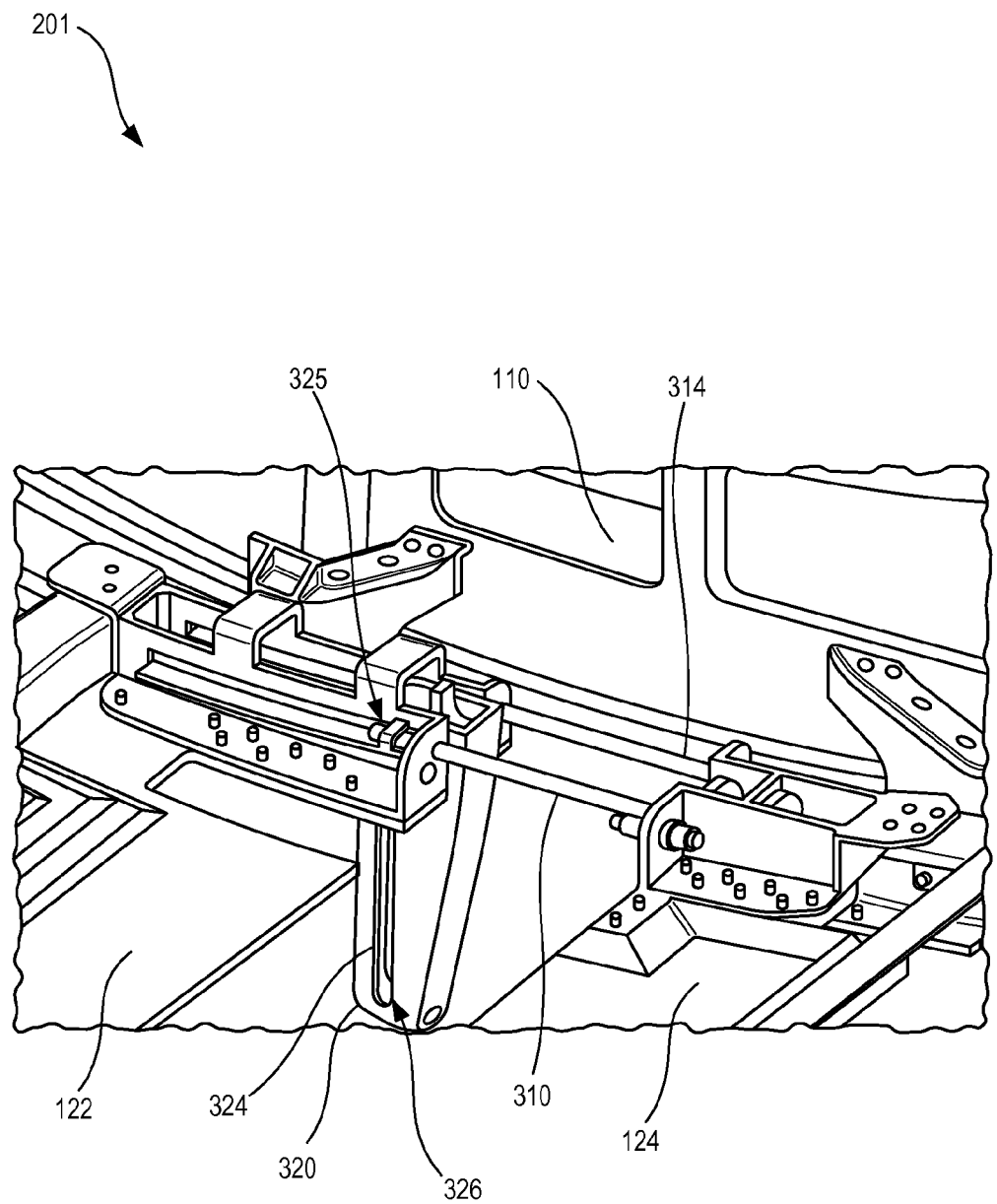
FIG. 4 illustrates a perspective view of a latch in an unlatched position in accordance with various embodiments of the disclosure.

Referring to FIG. 4, a perspective view of the number one latch 201 in an unlatched position is illustrated according to various embodiments. The axial rod 316 may be located within the proximal end 325 of the slot 324 in the handle 320. The push pin 310 may contact the right fan cowl panel 124 and separate the right fan cowl panel 124 and the left fan cowl panel 122. The weight of the right fan cowl panel 124 may exert a force on the push pin 310, which in turn exerts a force on the handle 320. However, the force may be exerted on the handle 320 at the proximal end 325 of the slot 324 in the handle 320. The proximal end 325 of the slot 324 may be located in line with the pivot point of the handle 320. Thus, the weight of the right fan cowl panel 124 may not create a torque on the handle 320. Therefore, the weight of the right fan cowl panel 124 will not cause the handle 320 to close. The number one latch 201 may maintain a separation between the left fan cowl panel 122 and the right fan cowl panel 124 until the handle 320 is rotated in the clockwise direction by maintenance personnel. The separation at the location of the number one latch 201 and circumferentially between the fan cowl panels and the inlet 110 may be easily visible to maintenance personnel, and an unlatched fan cowl may be discovered prior to an aircraft taking off.

Although illustrated with the push pin 310 contacting the right fan cowl panel 124, those skilled in the art will recognize that the number one latch 201 may be oriented in the reverse direction, such that the push pin 310 contacts the left fan cowl panel 122. Similarly, those skilled in the art will recognize that the push pin 310 could engage structure on the inlet 110 instead of engaging structure on the opposite fan cowl panel. In addition, those skilled in the art will recognize that a latch having a push pin may be utilized in any fan cowl latch and not only the number one latch. However, the order of latching and unlatching may be changed such that the latch with the push pin is latched first and unlatched last.

Although the latching mechanism is illustrated as latching two fan cowl panels together, it could also be readily adapted as a latching mechanism which extends between an IFS half and the engine, or between the two (left and right) IFS halves, or at any other nacelle location which utilizes latches.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An aircraft nacelle comprising:
   a first fan cowl panel rotatable about a first hinge and a second fan cowl panel rotatable about a second hinge, wherein the first fan cowl panel and the second fan cowl panel are rotatable between a closed position in which the first fan cowl panel and the second fan cowl panel form an exterior of the aircraft nacelle, and an open position in which the first fan cowl panel and the second fan cowl panel are separated; and
   a latching mechanism configured to prevent the first fan cowl panel from separating from the second fan cowl panel, wherein the latching mechanism comprises a push pin comprising a first rod, a second rod, and an axial rod connecting the first rod to the second rod;
   wherein the axial rod extends through a slot in the handle;
   wherein the slot comprises a proximal end and a distal end, and where the push pin is configured to slide from the distal end to the proximal end in response to the handle being opened; and
   wherein the push pin is configured to extend toward the second fan cowl panel from the first pan cowl panel in response to movement of a handle as the latching mechanism is being moved to an unlatched position.

2. The aircraft nacelle of claim 1, wherein the push pin is configured to separate the first fan cowl panel and the second fan cowl panel in response to the handle being rotated.

3. The aircraft nacelle of claim 1, wherein the latching mechanism one of multiple latches.

4. The aircraft nacelle of claim 1, wherein the latching mechanism is configured to maintain a separation between the first fan cowl panel and the second fan cowl panel in response to the latching mechanism being in an unlatched position.

5. The aircraft nacelle of claim 4, wherein the separation is visible between the first fan cowl panel and an inlet of the aircraft nacelle.

6. An aircraft nacelle comprising:
   a first fan cowl panel configured to move relative to the aircraft nacelle between a closed position and an open position to provide access to a fan case; and a latch comprising a handle and a push pin located at least partially within a slot in the handle, wherein the latch is coupled to the first fan cowl panel and movable between a latched position in which the latch prevents relative movement between the first fan cowl panel and a second fan cowl panel, and an unlatched position in which the latch permits relative movement between the first fan cowl panel and the second fan cowl panel;

wherein the latch push pin is configured to slide within the slot from a distal end of the slot to a proximal end of the slot in response to the handle opening and to extend toward the second fan cowl panel and prevent the first fan cowl panel from moving to the closed position when the latch is in the unlatched position.

7. The aircraft nacelle of claim 6, wherein, in the unlatched position, a separation is visible between the first fan cowl panel and an inlet of the aircraft nacelle.

8. The aircraft nacelle of claim 6, wherein the push pin comprises a first rod, a second rod, and an axial rod connecting the first rod to the second rod.

9. The aircraft nacelle of claim 8, wherein the axial rod is located within the slot.

\* \* \* \* \*